United States Patent
Kumar et al.

(10) Patent No.: US 10,349,210 B2
(45) Date of Patent: Jul. 9, 2019

(54) SCALING OUT MOVING OBJECTS FOR GEO-FENCE PROXIMITY DETERMINATION

(71) Applicant: Oracle International Corporation, Redwood Shores, CA (US)

(72) Inventors: Santosh Kumar, Bangalore (IN); Santosh Kumar Singh, New Delhi (IN); Prithviraj Singh, Bangalore (IN); Rahul Gupta, Bangalore (IN); Yathish Gatty, Bangalore (IN); Kunal Mulay, Indore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/249,468

(22) Filed: Jan. 16, 2019

(65) Prior Publication Data

US 2019/0149949 A1     May 16, 2019

Related U.S. Application Data

(63) Continuation of application No. 16/124,014, filed on Sep. 6, 2018, now Pat. No. 10,231,085.

(30) Foreign Application Priority Data

Sep. 30, 2017    (IN) .............................. 201741034830

(51) Int. Cl.
*H04W 24/00*     (2009.01)
*H04W 4/021*     (2018.01)
(Continued)

(52) U.S. Cl.
CPC ............ *H04W 4/021* (2013.01); *G06F 9/542* (2013.01); *G06F 16/2237* (2019.01);
(Continued)

(58) Field of Classification Search
None
See application file for complete search history.

(56) References Cited

U.S. PATENT DOCUMENTS 6,218,961 B1    4/2001    Gross et al.
6,833,811 B2   12/2004    Zeitfuss et al.
(Continued)

FOREIGN PATENT DOCUMENTS

| | | |
|---|---|---|
| CN | 104792337 | 7/2015 |
| WO | 2017135837 | 8/2017 |

OTHER PUBLICATIONS

"Lane Position and Vehicle-to-Vehicle Measurement", RT-RANGE, Oxford Technical Solutions Ltd., 2017, pp. 1-156.
(Continued)

*Primary Examiner* — Suhail Khan
(74) *Attorney, Agent, or Firm* — Kilpatrick Townsend & Stockton LLP

(57) ABSTRACT

An event processing system for distributing geospatial computations with geo-fences is disclosed. The system can partition and distribute geo-fences efficiently for parallel computation, and can track a potentially unlimited number of moving objects. A computing device determines a minimum bounding rectangle (MBR) covering a geographic area indexed by a geo-grid, and partitions the MBR and a set of geo-fences to a plurality of processing nodes. The computing device receives input events of a stream comprising locations within the geographic area. The device distributes the events to partitions on processing nodes, based at least on the events' locations. The device can determine a partition identifier corresponding to a respective location in constant time. The computing device then combines partition results to obtain a single geospatial computation result.

20 Claims, 11 Drawing Sheets

(51) Int. Cl.
*G06F 9/54* (2006.01)
*H04W 4/02* (2018.01)
*G06F 16/29* (2019.01)
*G06F 16/22* (2019.01)
*H04L 29/08* (2006.01)

(52) U.S. Cl.
CPC .............. *G06F 16/29* (2019.01); *H04L 67/18* (2013.01); *H04W 4/023* (2013.01)

(56) References Cited

U.S. PATENT DOCUMENTS

| | | | |
|---|---|---|---|
| 7,164,986 | B2 | 1/2007 | Humphries et al. |
| 7,961,631 | B2 | 6/2011 | Chen et al. |
| 8,099,452 | B2 | 1/2012 | Chkodrov et al. |
| 8,463,487 | B2 | 6/2013 | Nielsen et al. |
| 9,137,636 | B2 | 9/2015 | Sheha et al. |
| 9,207,679 | B1 | 12/2015 | Chatham |
| 9,262,479 | B2 | 2/2016 | Deshmukh et al. |
| 9,286,354 | B2 | 3/2016 | Cammert et al. |
| 9,319,471 | B2 | 4/2016 | Diem |
| 9,408,034 | B2 | 8/2016 | Zhu |
| 9,477,537 | B2 | 10/2016 | Dyer et al. |
| 9,495,783 | B1 | 11/2016 | Samarasekera et al. |
| 9,535,761 | B2 | 1/2017 | Park et al. |
| 9,571,968 | B1 | 2/2017 | Barron et al. |
| 9,584,977 | B2 | 2/2017 | Yamamoto |
| 9,671,232 | B2 | 6/2017 | Nandan |
| 9,804,892 | B2 | 10/2017 | Park et al. |
| 2011/0250875 | A1 | 10/2011 | Huang et al. |
| 2013/0191370 | A1 | 7/2013 | Chen et al. |
| 2014/0357299 | A1 | 12/2014 | Xu et al. |
| 2016/0283554 | A1 | 9/2016 | Ray et al. |
| 2016/0377438 | A1 | 12/2016 | Kim et al. |
| 2017/0162053 | A1 | 6/2017 | Margalef Valldeperez et al. |
| 2017/0178117 | A1 | 6/2017 | Mcclard et al. |
| 2017/0230791 | A1 | 8/2017 | Jones |
| 2017/0316033 | A1 | 11/2017 | Rishe |
| 2017/0372612 | A1 | 12/2017 | Bai et al. |
| 2018/0075109 | A1 | 3/2018 | Park et al. |

OTHER PUBLICATIONS

"Region Monitoring and iBeacon", Available online at: https://developer.apple.com/library/content/documentation/UserExperience/Conceptual/LocationAwarenessPG/RegionMonitoring/RegionMonitoring.html, Mar. 21, 2016, 2 pages.

U.S. Appl. No. 16/124,014, "Notice of Allowance", dated Oct. 24, 2018, 10 pages.

Chandrashekar, "Announcing real-time Geospatial Analytics in Azure Stream Analytics", dated Mar. 1, 2017, 4 pages.

Combaneyre, "Location Analytics: Minority Report is Here—Real-Time Geofencing Using SAS® Event Stream Processing", Paper SAS395-2017, Available online at: http://support.sas.com/resources/papers/proceedings17/SAS0395-2017.pdf, 2017, pp. 1-10.

Guo et al., "Location-Aware Pub/Sub System: When Continuous Moving Queries Meet Dynamic Event Streams", Available on Internet at: http://www.nextcenter.org/wp-content/uploads/2017/08/Location-Aware-Pub-Sub-System-When-Continuous-Moving-Queries-Meet-Dynamic-Event-Streams.pdf, May-Jun. 2015, 15 pages.

Hastings et al., "A Scalable Technique for Large Scale, Real-Time Range Monitoring of Heterogeneous Clients", 3rd International Conference on Testbeds and Research Infrastructure for the Development of Networks and Communities, 2007, pp. 1-6.

Hong et al., "A Grid-Based Node Split Algorithm for Managing Current Location Data of Moving Objects", The Journal of Supercomputing, vol. 42, Issue 3, Dec. 2007, pp. 321-337.

Park, "Location-Based Grid-Index for Spatial Query Processing", Expert Systems with Applications, vol. 41, Issue 4, Part 1, Mar. 2014, pp. 1294-1300.

Patroumpas et al., "Managing Trajectories of Moving Objects as Data Streams", Proceedings of the Second Workshop on Spatio-Temporal Database Management (STDBM'04) Aug. 30, 2004, pp. 41-48.

Shields, "RT-Range Measurements", OxTS Support, Available online at: https://support.oxts.com/hc/en-us/articles/115002772345-RT-Range-Measurements Feb. 7, 2018, pp. 1-12.

Siksnys et al., "A Location Privacy Aware Friend Locator", Advances in Spatial and Temporal Databases, 11th International Symposium, Jul. 8-10, 2009, pp. 405-410.

Stubbs et al., "A Real-Time Collision Warning System for Intersections", Available online at: https://pdfs.semanticscholar.org/9695/97d93a41c4a377adf5fb22276218f6e62015.pdf, 2018, pp. 1-16.

Zhang et al., "Continuous Intersection Joins Over Moving Objects", Available on Internet at: https://pdfs.semanticscholar.org/5679/fc04db63a7f422ce350207058dc494cf9d4a.pdf, Apr. 2008, 10 pages.

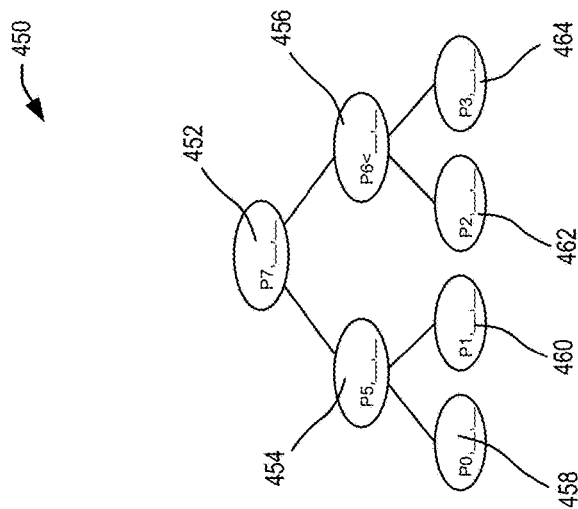
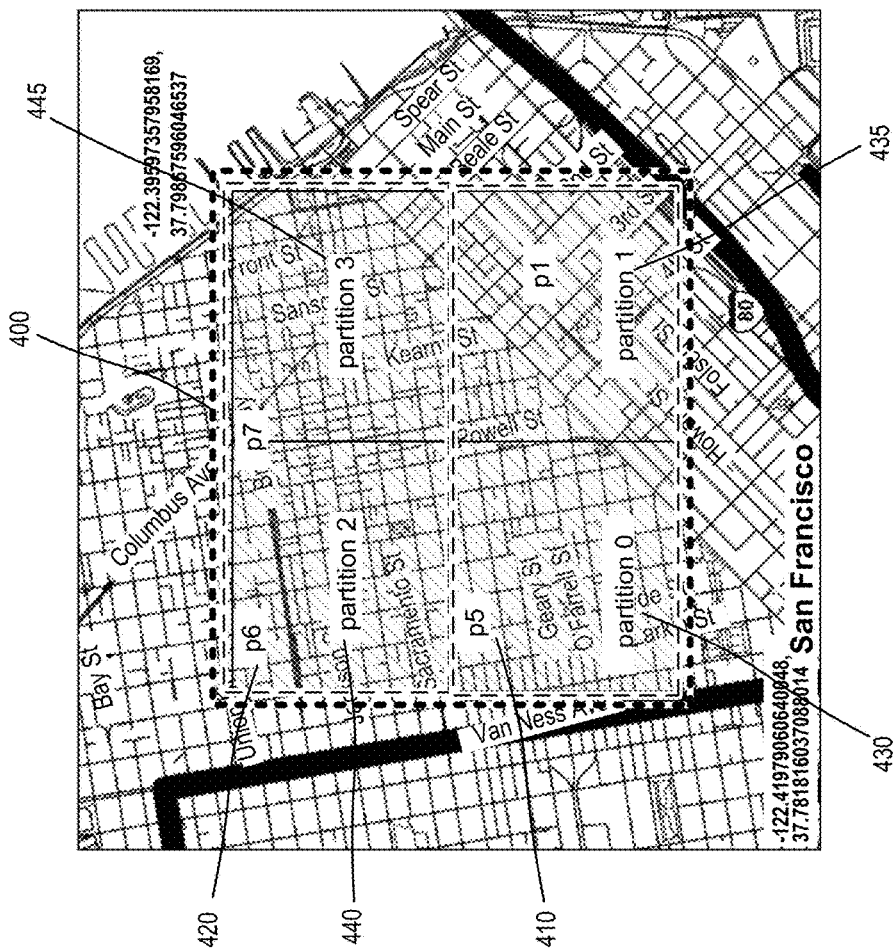
FIG. 4B
FIG. 4A

SCALING OUT MOVING OBJECTS FOR GEO-FENCE PROXIMITY DETERMINATION

CROSS-REFERENCE TO RELATED APPLICATION

The present application is a continuation of, and claims the benefit and priority to U.S. application Ser. No. 16/124,014, filed Sep. 6, 2018, entitled "SCALING OUT MOVING OBJECTS FOR GEO-FENCE PROXIMITY DETERMINATION", which claims the benefit and priority of India Application No. 201741034830, filed Sep. 30, 2017, the entire contents of which is herein incorporated by reference for all purposes. This application is also related to U.S. Non-Provisional application Ser. No. 16/123,973, filed Sep. 6, 2018, entitled "GEO-HASHING FOR PROXIMITY COMPUTATION IN A STREAM OF A DISTRIBUTED SYSTEM," the entire contents of which is also incorporated herein by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for processing events of an event stream.

In an embodiment, a computing device determines a geo grid minimum bounding rectangle (MBR) covering a geographic area indexed by a geo grid. The computing device then partitions the geo grid minimum bounding rectangle to a respective processing node of a plurality of processing nodes. The computing device replicates a set of geo fences to the plurality of processing nodes, wherein the geo fences bound regions within the geographic area. The computing device receives input events of a stream, a respective input event comprising respective location information for a location within the geographic area. The computing device distributes the respective input event to a respective partition on the respective processing node based at least in part on the respective location information. The computing device then receives, from the respective processing node, an output result corresponding to a respective partition result. The computing device then combines the respective partition result with a second partition result to obtain a single result corresponding to a geospatial computation. Finally, the computing device outputs the single result corresponding to the geospatial computation for a user.

In an embodiment, when distributing the respective input event to the respective partition, the computing device further determines a partition identifier corresponding to the respective location in constant time.

In an embodiment, determining the partition identifier corresponding to the respective location in constant time can be based at least in part on a grid cell partitioner (sometimes referred to herein, e.g., as GridCellPartitioner) partition representation.

In an embodiment, determining the partition identifier corresponding to the respective location information in constant time is based at least in part on computing the partition identifier.

In an embodiment, computing the partition identifier is based at least in part on a modulus operation and/or a matrix operation.

In an embodiment, the computing device further maps the partition identifier to the respective processing node based at least in part on a modulus operation, a division operation, and/or a custom function.

In an embodiment, the computing device further adjusts a cell size of the geo grid.

In an embodiment, responsive to the respective location information of the respective input event matching a respective geo fence, the respective partition result is computed, by the respective processing node, as a spatial function applied to at least the respective location information. Some, any, or all of the above features may be implemented as a method, system, or computer-readable storage medium.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 4A illustrates example spatial geo-fence data stored by a sparse partitioner, in accordance with an embodiment of the present disclosure.

FIG. 4B illustrates an example R-Tree structure of a sparse partitioner storing spatial geo-fence data, in accordance with an embodiment of the present disclosure.

DETAILED DESCRIPTION

Figure 1:
FIG. 1 illustrates example geo-fences delineating geographical boundaries on a map.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
. . .

In the above stream, for stream element (<timestamp_N+1>, <ORCL,62>), the event is <ORCL,62> with attributes "stock_symbol" and "stock value." The timestamp associated with the stream element is "timestamp_N+1". A continuous event stream is thus a flow of events, each event having the same series of attributes.

As noted, a stream may be the principal source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS.

Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Real Time Streaming & Event Processing Analytics

With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The Oracle Stream Analytics platform delivers on Fast Data with responsiveness. Oracle Edge Analytics pushes processing to the network edge, correlating, filtering and analyzing data for actionable insight in real-time.

The Oracle Stream Analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the Oracle Stream Analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The Oracle Stream Analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the Oracle Stream Analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The Oracle Stream Analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

The techniques described above and below may be implemented in a number of ways and in a number of contexts. Several example implementations and contexts are provided with reference to the following figures, as described below in more detail. However, the following implementations and contexts are but a few of many.

Oracle Stream Analytics Architecture

Embodiments of the present disclosure provide techniques for receiving and processing data streaming from an event source. In various embodiments, the Oracle Stream Analytics system comprises a Stream Analytics server, Stream Analytics Visualizer, a command-line administrative interface, and an Integrated Development Environment (IDE). The Stream Analytics server hosts logically related resources and services for running Stream Analytics applications. Servers may be grouped into and managed as domains. A domain can have one server (standalone-server domain) or many (multiserver domain). The Stream Analytics' domains and servers may be managed through the Stream Analytics Visualizer and the command-line administrative interface. In some embodiments, the Stream Analytics Visualizer is a web-based user interface through which Stream Analytics applications running on the Stream Analytics server are deployed, configured, tested, and monitored. In some embodiments, the command-line administrative interface enables a user to manage the server from the command line and through configuration files. For example, the user may start and stop domains and deploy, suspend, resume, and uninstall an applications. Advantageously, the Oracle Stream Analytics system is developed to simplify the complex event processing operations and make them available even to users without any technical background.

The Oracle Stream Analytics system adopts multi-layer software architecture. The Java Virtual Machine (JVM) provides most fundamental support at the lowest level. Above that is the OSGi framework, which manages the Java packages between software modules and deals with class versioning and loading. Spring Dynamic Modules lies above the OSGi framework, which is responsible for service instantiation and dependency injection. Above that comes the Oracle Stream Analytics server modules layer. This layer provides the core Oracle Stream Analytics functionality, including the CQL engine, server management and input/output data handling. The highest level in the architecture is the application layer.

A typical data flow through an Oracle Stream Analytics application starts from incoming event data streams. The data is converted and used by an adapter to create event objects that can be obtained by any component that registered to listen to the adapter. A channel is one of those components that can listen to adapters. Data goes through the channel all the way to the CQL processor component, which is able to efficiently process data using the query language (CQL). The output can be sent to downstream listeners.

Scaling Out Moving Objects for Geo-Fence Proximity Determination

Embodiments of the present disclosure provide techniques for distributing a geospatial computation, and processing events in an event stream. In particular, the disclosed system and methods can perform a geospatial computation on a geographical grid with geo-fences and a potentially unlimited number of moving objects, in parallel.

In many applications, a stream processing system may receive a plurality of predefined geographical boundaries described by geo-locations (e.g., representing bank or ATM premises, bus or railway stations, airports, secured premises, etc.) which will be referred to as geo-fences. FIG. 1 illustrates example geo-fences 102-108, delineating geographical boundaries on a map 100. In some examples, these geo-fences can be limited in number, and therefore can be cached within or across the processing nodes. In some embodiments, the disclosed system and methods allows for distributing a potentially unlimited number of geo-fences across processing nodes, as long as sufficient nodes are available.

By contrast, the system can receive a very large, or unbounded, number of events from the input stream. In a typical example, each event can contain a current location (e.g., the location at a time t) of a moving object, such as a human or smart device. The system may perform a query or computation (e.g., a proximity computation) on the stream of events. For example, the system can track all the moving objects that enter or exit the geo-fences, such as to monitor people who enter or exit an airport, bus station, or other public space, or to offer promotions to customers in a particular shopping mall, or passing a particular restaurant at a particular time. In another example, the system could monitor safety hazards in real time, such as predicting the risk of a collision between vehicles on a bridge or in a tunnel.

To facilitate such real-time event processing with respect to geo-fences, the disclosed system and methods can partition and distribute the events over a plurality of processing elements, such as nodes, central processing units (CPUs), computing cores, and/or graphical processing units (GPUs) in a stream processing system. Moreover, the overall geographical regions that contain the event locations and the geo-fences can be large and sparse (e.g., a country or countries, or the entire globe). Thus, the event partitioner can partition the events in a partitioned virtual geo-grid 110, which can include the associated metadata. For example, the metadata can include Minimum Bounding Rectangle (MBR) 112, described by coordinates of a rectangle bounding the region, the total number of cells, or the number of horizontal and vertical gradations in the geo-grid.

In the example of FIG. 1, geo-grid 110 containing geo-fences 102-108 is surrounded by MBR 112. An MBR is the smallest rectangle that can cover the entirety of a defined area. In order to cover all portions of the defined area, the MBR may typically be larger than the defined area. For example, in FIG. 1, MBR 112 is larger than the union of geo-fences 102-108. In some cases, an MBR is used because a rectangle is easy to store (only two data points are needed to draw the MBR) and easily partitioned.

Figure 2:
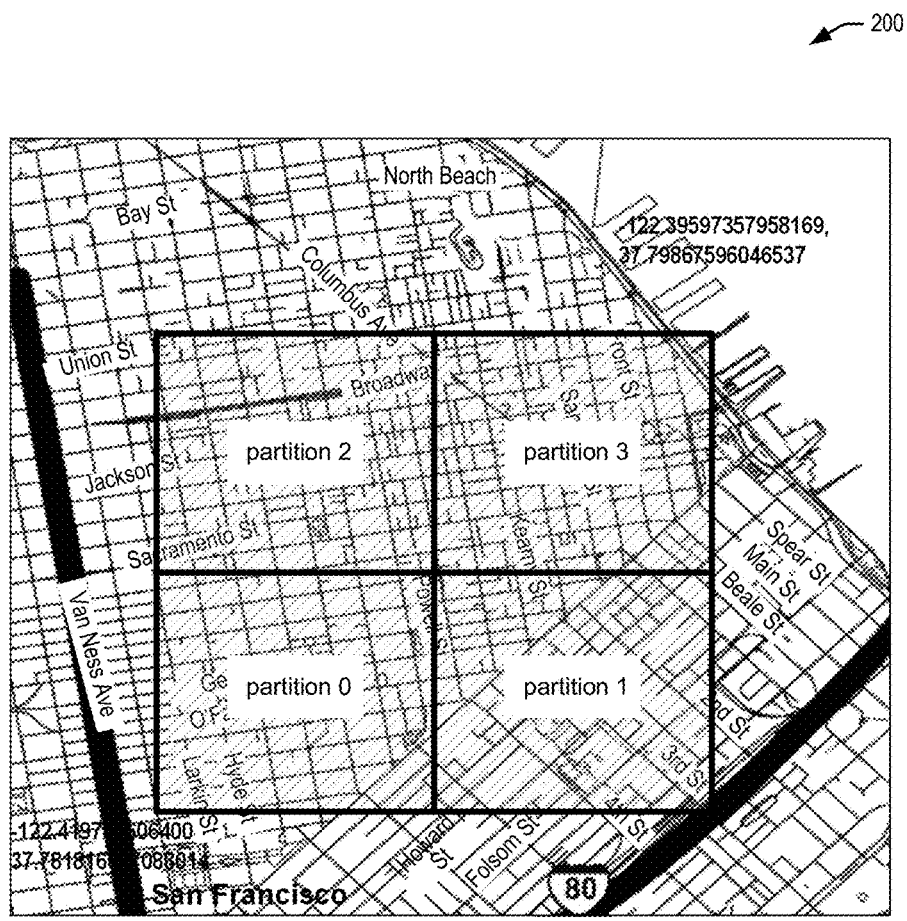
FIG. 2 illustrates an example partitioned minimum bounding rectangle (MBR) of a partitioned geo-grid, in accordance with an embodiment of the present disclosure.

FIG. 2 illustrates an example partitioned MBR covering a partitioned geo-grid 200, in accordance with an embodiment of the present disclosure. The system can receive an input stream of events, which can include locations and timestamps, and can partition the incoming events according to the MBR partition in which they are located. In an embodiment, the grid cells can be used to partition stream events and/or geo-fences among the processing nodes in a computing cluster, as will be described further below. Moreover, the system can adjust the size of the grid cells, e.g., to improve the distribution of geolocations across processing nodes. Alternatively, the system can adjust the grid cell size based on a cutoff distance for the application of a geospatial computation between events, which may be specified, e.g., by a user.

In particular, based on the current location of the event, the system can use an event partitioner, such as a grid cell partitioner or a range partitioner, to determine the cell where the current location falls inside the virtual geo-grid (e.g., by a calculation or by a data structure lookup). In an embodiment, the event partitioner can return a grid identifier or partition number for a given location (e.g., expressed as latitude and longitude) in constant time. It can then map the cell into one of the available processing nodes using a modulus operation, a division operation, or a custom function.

Figure 3B:
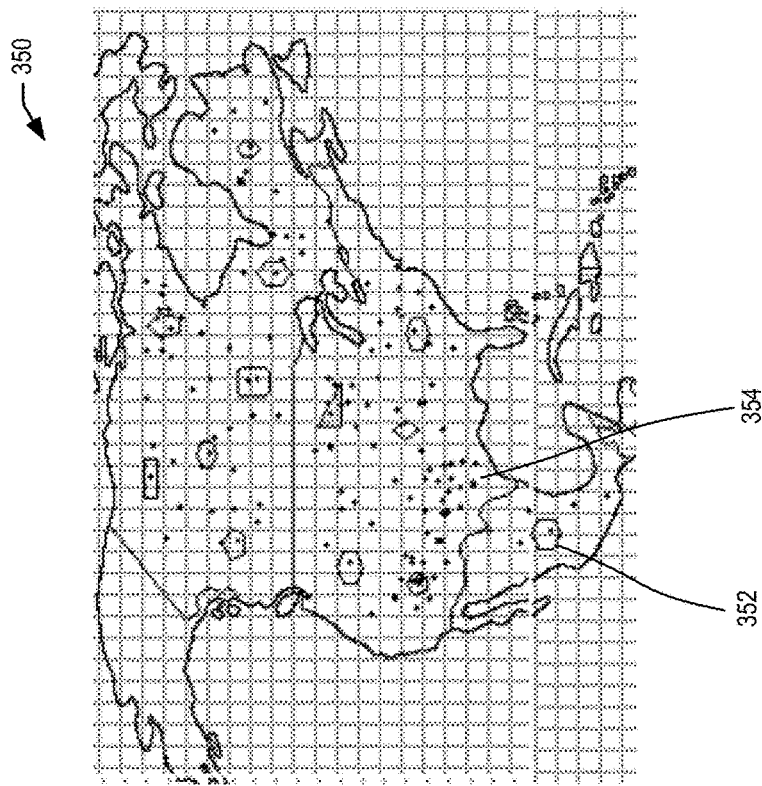
FIG. 3B illustrates an example of distributed event locations in a partitioned geo-grid with geo-fences, in accordance with an embodiment of the present disclosure.
Figure 3A:
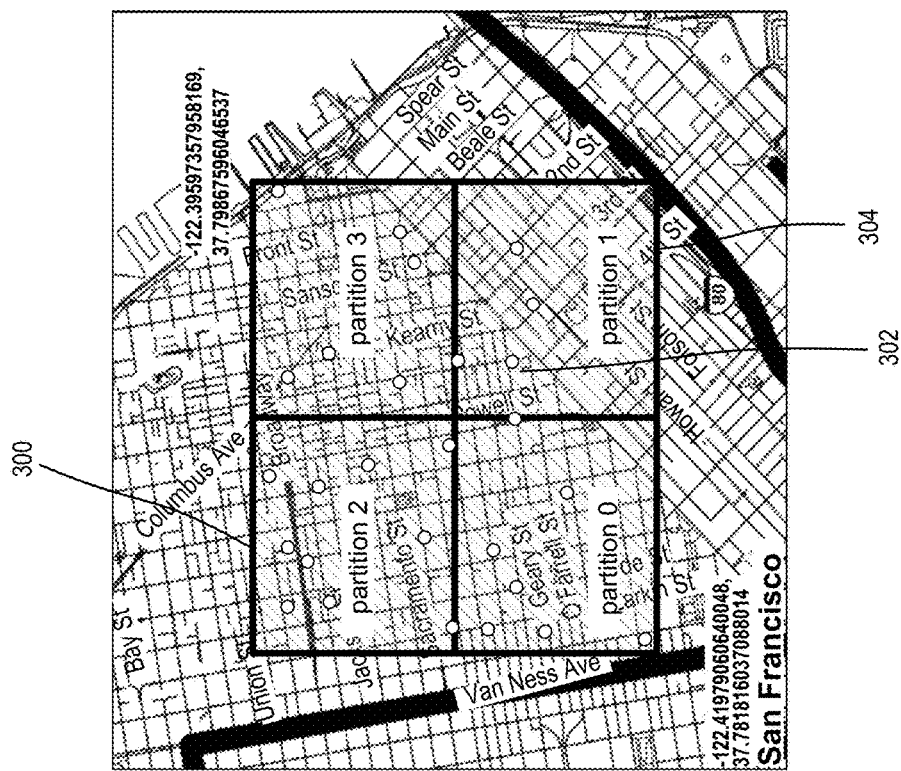
FIG. 3A illustrates an example of distributed event locations in a partitioned geo-grid, in accordance with an embodiment of the present disclosure.

FIG. 3A illustrates an example of distributed event locations in a partitioned geo-grid 300, in accordance with an embodiment of the present disclosure. In an embodiment, the event partitioner can partition events efficiently by comparing the event locations, such as event location 302, to boundaries of the partitions of the MBR, such as partition 304. In particular, the event partitioner can implement a grid cell partitioner (sometimes referred to herein, e.g., as GridCellPartitioner) that does not need to store the geometries of the geo-grid or the geo-fences, or an index of such geometries, to calculate the partition. Alternatively, the system can implement a range or sparse partitioner (sometimes referred to herein, e.g., as RangePartitioner and SparsePartitioner, respectively) based on a data structure, such as R-Tree or TreeSet. In an embodiment, the event partitioner can return a grid identifier, such as a partition number, for a given location in constant time. The disclosed system and methods therefore can use a very large virtual grid with a large number of cells to distribute the events more evenly across the processing nodes.

The geo-grid cells can correspond to partitions, which can be distributed among processors in order to partition the incoming event stream. In an embodiment, the system can adjust the size of these geo-grid cells or partitions. FIG. 3B illustrates an example of distributed event locations in a partitioned geo-grid 350 with geo-fences, in accordance with an embodiment of the present disclosure. In this example, the geo-grid 350 has some geo-fences such as geo-fence 352 across multiple geo-grid cells, and has a large number of event geo-locations, such as event geo-location 354, distributed across the geo-grid partitions.

In the example of FIG. 3B, geo-grid 300 has hundreds of cells, but the system can adjust the cell size of the geo-grid (i.e., by adjusting the total number of latitudinal and longitudinal divisions, or rows and columns, in the geo-grid) to improve the distribution of geo-locations across the processing nodes. In an embodiment, because the system does not need to store each cell of the geo-grid in any of the processing nodes to evaluate the cell (partition) of a geo-location, the disclosed system and method has no practical limits on the size of the geo-grid. For example, the system can use a geo-grid as large as the entire globe, with a grid-cell size of 1 meter or even smaller, in order to partition geo-locations precisely anywhere on the globe.

Geo-Stream Partitioner

Techniques for tracking large but finite numbers of moving objects in an event processing system are described in U.S. Pat. No. 9,535,761, issued on Jan. 3, 2017, the disclosure of which is herein incorporated by reference in its entirety. As described there, an event processing system can store the geo-fences with a sparse partitioner on a single master node that can keep track of which geo-fences are located in each geo-grid partition. The system and methods disclosed herein can improve on previous techniques by replicating and/or partitioning the geo-fences across processing elements, and can avoid constraints on the total number of moving objects.

In various embodiments, the disclosed system can make use of various implementations of the geo-stream event partitioner, including a grid cell partitioner, a range partitioner, and a sparse partitioner. These event partitioner implementations can locate and return the partition identifier of geometry in which a given geometry falls inside a list of partitioned geometry. For example, the list of partitioned geometry can be a grid of continuous rectangle geometry.

In an example embodiment, the system may use the grid cell partitioner to return the partition identifier of locations of events in the stream. Unlike the range partitioner, the grid cell partitioner (a custom partitioner) does not need to store the grid cells or partitions in a data structure (e.g., TreeSet) in order to identify the cell or partition of the grid for a given location. Instead, the grid cell partitioner can evaluate the cell/partition of a geo-location via a computation. grid cell partitioner can use metadata corresponding to the virtual geo-grid, for example, the total number of cells/partitions in the geo-grid, and/or the MBR of the grid, which may be expressed as minimum/maximum latitude/longitude of the spatial reference system (SRS) and spatial reference system identifier (SRID).

In an embodiment, the grid cell partitioner can compute the cell/partition for a given geo-location (expressed, e.g., as SRS coordinates (xGrid, yGrid)) by a 2-D grid matrix CPU computation, such as: (xGrid+yGrid*m_nLngGrid) % (m_nLngGrid*m_nLatGrid). That is, the partition number can be computed, using a modulus operation, as a one-dimensional index from the two-dimensional SRS coordinates (xGrid, yGrid). Here, xGrid can be calculated as, xGrid=(int) ((lng−m_minLng)/lngGridSize) and yGrid can be calculated as yGrid=(int) ((lat−m_minLat)/latGridSize) for a given geo-location with latitude (lat) and longitude (lng) value and a grid metadata m_minLat, m_minLng, latGridSize and lngGridSize (derived from MBR). Thus, xGrid and yGrid can be computed by rounding the SRS coordinates to the nearest integer number of grid cell units.

After finding the cell (partition) of the current location of an event using grid cell partitioner, the system can then map the cell into one of the available processing nodes using a division operation, modulus operation, and/or a custom function. Since the event partitioner (grid cell partitioner) can compute the partition without the need to store any geometries or geometry indices in a data structure, it can use a very large virtual grid with large number of cells to distribute the events more evenly across the processing nodes.

In some embodiments, the system can use alternative partitioners to identify the partitions of events. The range partitioner, or RangePartitioner, can use a RangePartitionGrid. The RangePartitionGrid can divide a rectangular region, such as a map, into a two-dimensional geo-grid structure. The RangePartitionGrid can further allocate an identifier (e.g., a number from 0 to the total number of grid cells) to each grid cell, called a partition. In an embodiment, the range partitioner maintains a TreeSet or similar data structure of partitions, to locate and return the partition number of a given geometry. The system can make use of other data structures, and is not limited by the present disclosure.

The sparse partitioner, or SparsePartitioner, can use an R-Tree or similar data structure to maintain the partitions. Because R-Tree can handle overlapping geometries, it can support overlapping partitions. On invocation of the partition method, the sparse partitioner can invoke rtree.search to locate all partitions that contain the input geometry, and return the corresponding list of partition identifiers. The system can also make use of other partitioner implementations and/or other data structures, and is not limited by the present disclosure.

Replicating Geo-Fences

In some typical examples, the geo-fences may be limited in number (e.g., from several hundred to several thousand), so storing the entire set of geo-fences on each processing node is not too costly. In such cases, the system can replicate the entire set of static geo-fences over all the processing nodes, and only partitions the stream events (representing, e.g., the locations of moving objects) among the nodes. In particular, the system can partition the events using an event partitioner, such as the various implementations described above. In an embodiment, the system can store the geo-fences in a data structure, such as the structures discussed with respect to the range and sparse partitioners, but can replicate the data structure on all the processing elements. In a typical embodiment, the system replicates the geo-fences according to the following steps.

First, the system can create a partitioned virtual geo-grid based on a partitioner, such as grid cell partitioner or a range partitioner. In an embodiment, the partitioner can return the grid identifier (a partition number) for a given location (i.e., latitude and longitude) in constant time. The partitioner can store an MBR of the geo-grid's boundary, as in the examples of FIGS. 2 and 3A. The partitioner can also store details of the partitions, such as the total number of partitions, as well as the SRID and any other SRS-specific details. In an example, the initialization parameters for the grid and their default values could be:

1. Total number of geo-grid cells or partitions. This can equal the number of processing nodes, or can greatly exceed the number of processors.
2. MBR of grid=minimum and maximum latitude and longitude of the spatial reference system (SRS) corresponding to the geo-grid
3. A partition policy or default action to take if any location falls outside the grid MBR, such as assigning to a default partition or ignoring Next, the system can replicate the geo-fences on each processing node. For example, suppose there are four fences defined in the partitioned region (i.e., SF_fence1, SF_fence2, SF_fence3, SF_fence4), as in FIG. 1, and the system distributes processing over two nodes. Then the partitions can be mapped to processing nodes as in the example of Table 1. In another example, the system can map the partitions shown in FIG. 3B to the processing nodes, as in Table 2.

TABLE 1

| Node | Partitions | Geo-fences |
|---|---|---|
| Processing node 1 | Partitions (0, 2) | SF_fence1-4 (all fences) |
| Processing node 2 | Partitions (1, 3) | SF_fence1-4 (all fences) |

TABLE 2

| Node | Partitions | Geo-fences |
|---|---|---|
| Processing node 1 | Partitions 1 to 400 | All 13 fences |
| Processing node 2 | Partitions 401 to 800 | All 13 fences |

Next, the system partitions the stream event geo-locations using an event partitioner, such as a grid cell partitioner, and distributes these among the processing elements. The system can use a modulus operation, a division operation, or another custom function to map the cell into one of the available processing nodes. For instance, in the example of Table 2, there are 800 partitions evenly distributed over just two nodes by a contiguous mapping. In the example of Table 1, four partitions are evenly distributed over two nodes by a staggered mapping, i.e. the assigned node is given by the partition number modulo the total number of nodes. Other partition-to-node mappings are also possible, including by a load balancing function, partitioning function, or another custom function, and are not limited by this disclosure. The system can apply spatial operators (such as withindistance, contain, etc.) to evaluate the proximity of event locations within the geo-fences in each processing node, since each node stores all the geo-fences. In some embodiments, each node can also store a data structure index, e.g. an R-Tree index, of all the geo-fences.

Partitioning the Set of Geo-Fences

Alternatively, in another example, the geo-grid contains too many geo-fences to replicate on each processing node.

This can occur because of the memory requirement to store all the geo-fences on each processing node, and/or because of the limitation of the number of geometries that can be stored in a data structure, such as R-Tree, particularly if such a structure grows in complexity faster than the number of elements. Accordingly, in some embodiments, the system can partition the geo-fences, in addition to the geo-stream events, across the processing nodes. In a typical embodiment, the system performs the partitioning according to the following steps.

First, the system creates a partitioned virtual geo-grid using a partitioner such as the range partitioner, i.e., RangePartitionerGrid. In an embodiment, the partitioner can return the grid identifier (a partition number) for a given location (i.e., latitude and longitude) in constant time. The partitioner can store an MBR of the geo-grid's boundary, as in the examples of FIGS. 2 and 3A. The partitioner can also store details of the partitions, such as the total number of partitions, as well as the SRID and any other SRS-specific details. In an example, the initialization parameters for the grid and their default values could be:

1. Total number of geo-grid cells or partitions. This can equal the number of processing nodes, or can greatly exceed the number of processors.
2. MBR of grid=minimum and maximum latitude and longitude of the spatial reference system (SRS) corresponding to the geo-grid
3. A partition policy or default action to take if any location falls outside the grid MBR, such as assigning to a default partition or ignoring Next, the system can create a sparse partitioner, and stores the partitions of the partitioned geo-grid (e.g., RangePartitions) in the sparse partitioner. FIG. 4A illustrates example spatial geo-fence data stored by a sparse partitioner, in accordance with an embodiment of the present disclosure. In this example, overall geo-grid 400 (labeled "P7") is sub-divided in a hierarchical manner into the two main partitions, partition 410 (labeled "P5") and partition 420 (labeled "P6"). Partition 410, in turn, is sub-divided hierarchically into partition 430 (labeled "partition 0") and partition 435 (labeled "partition 1"), while partition 420 is sub-divided into partition 440 (labeled "partition 2") and partition 445 (labeled "partition 3"). Thus, in this example, geo-grid 400 is partitioned into a total of four partitions 430, 435, 440, and 445 for processing by the distributed nodes. In an example, there could be four processing nodes, enabling a one-to-one mapping of partitions to nodes.

The SparsePartitioner can internally use an R-Tree or similar data structure to store each RangePartition as a rectangle geometry. FIG. 4B illustrates an example R-Tree structure 450 that belongs to a sparse partitioner storing spatial geo-fence data, in accordance with an embodiment of the present disclosure. R-Tree structure 450 can store the hierarchy of partitions, as in the example of FIG. 4A. As shown, the root node 452 of R-Tree structure 450 branches into two main branches, 454 and 456, storing main partitions "P5" and "P6," respectively. Branch 454 branches into leaf node 458, storing the smaller partition "P0," and leaf node 460, storing the smaller partition "P1." Branch 456 branches into leaf node 462, storing the smaller partition "P2," and leaf node 464, storing the smaller partition "P3."

Next, for each geo-fence polygon, the system computes a geo-fence MBR and its buffered MBR polygon. FIG. 5A illustrates example partitioned geo-fences with MBRs, in accordance with an embodiment of the present disclosure. In this example, the geo-fences are the same as in the example of FIG. 1. As shown, each geo-fence is surrounded by an MBR, for example geo-fence 502 is surrounded by MBR 504. MBR 504, in turn, is partitioned into partitions 506 and 508.

Figure 5B:
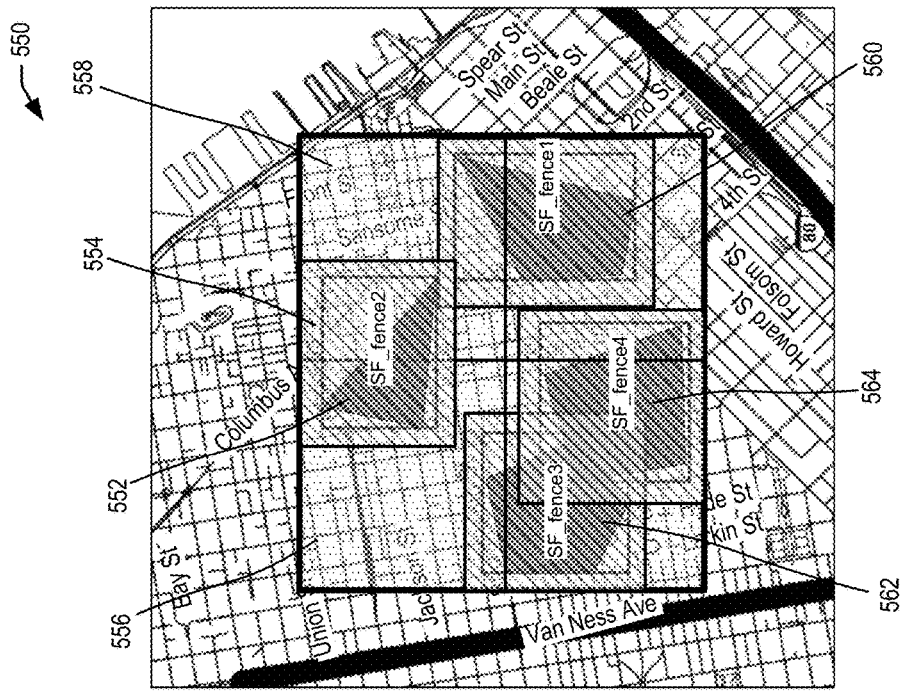
FIG. 5B illustrates example partitioned geo-fences with buffered MBRs, in accordance with an embodiment of the present disclosure.
Figure 5A:
FIG. 5A illustrates example partitioned geo-fences with MBRs, in accordance with an embodiment of the present disclosure.

FIG. 5B illustrates example partitioned geo-fences with buffered MBRs, in accordance with an embodiment of the present disclosure. In this example, the partitioned geo-fence polygons with MBRs from the example of FIG. 5A are shown with buffers. For example, region 550 includes geo-fence 552, which is surrounded by buffered MBR 554. Buffered MBR 554, in turn, belongs to both partitions 556 and 558.

The system then obtains all the partition identifiers from the sparse partitioner for each buffer polygon. The system can replicate each geo-fence in the corresponding partitions. In this example, there are four geo-fences defined in region 550, i.e., geo-fence 552 (labeled "SF_fence2"), geo-fence 560 ("SF_fence1"), geo-fence 562 ("SF_fence3"), and geo-fence 564 ("SF_fence4").

TABLE 3

| Node | Partitions | Geo-fences |
| --- | --- | --- |
| Processing node 1 | Partition 0 | Geo-fence 562, 564 (SF_fence3, SF_fence4) |
| Processing node 2 | Partition 1 | Geo-fence 560, 564 (SF_fence1, SF_fence4) |
| Processing node 3 | Partition 2 | Geo-fence 552, 562 (SF_fence2, SF_fence3) |
| Processing node 4 | Partition 3 | Geo-fence 560, 564 (SF_fence1, SF_fence2) |

For example, suppose that the computing cluster has four processing nodes, corresponding to the four partitions shown in FIG. 5B. Then the partitions can be mapped to processing nodes as in the example of Table 3. Here, a respective geo-fence is distributed to each partition on which all, or part, of its buffered MBR is located. For example, SF_fence1 appears on both partitions 1 and 3, and therefore is distributed to both nodes 2 and 4 for parallel processing. If a query or computation (e.g., proximity, withindistance, contain, etc.) is to be performed on a respective geo-fence, then each node storing the respective geo-fence can determine whether to perform the computation. For example, for a computation involving SF_fence1, both nodes 2 and 4 can determine whether to perform the computation. In an embodiment, the sparse partitioner can handle overlapping geometries, and therefore the system can support overlapping geo-fences and/or buffered MBRs, such as those of SF_Fence3 and SF_fence4.

Finally, the system can partition the geo-stream events based on their locations using an event partitioner such as a grid cell partitioner or range partitioner (GridCellPartitioner or RangePartitioner), and distributes the partitioned events on processing nodes. The system can use a modulus operation, a division operation, or a load balancing function, partitioning function, or another custom function, to map the partitions to nodes. Each processing node can store the geo-fences. In embodiments where a data structure index of the geo-fences, e.g. an R-Tree index, is needed to process the distributed events (e.g., by computing a spatial function on events located in the geo-fences), the respective node can also store the data structure index. Accordingly, each processing node can utilize spatial operators such as withindistance, contain etc., in order to compute spatial functions such as proximity in parallel.

Process for Distributed Geospatial Computation with Geo-Fences

Figure 6:
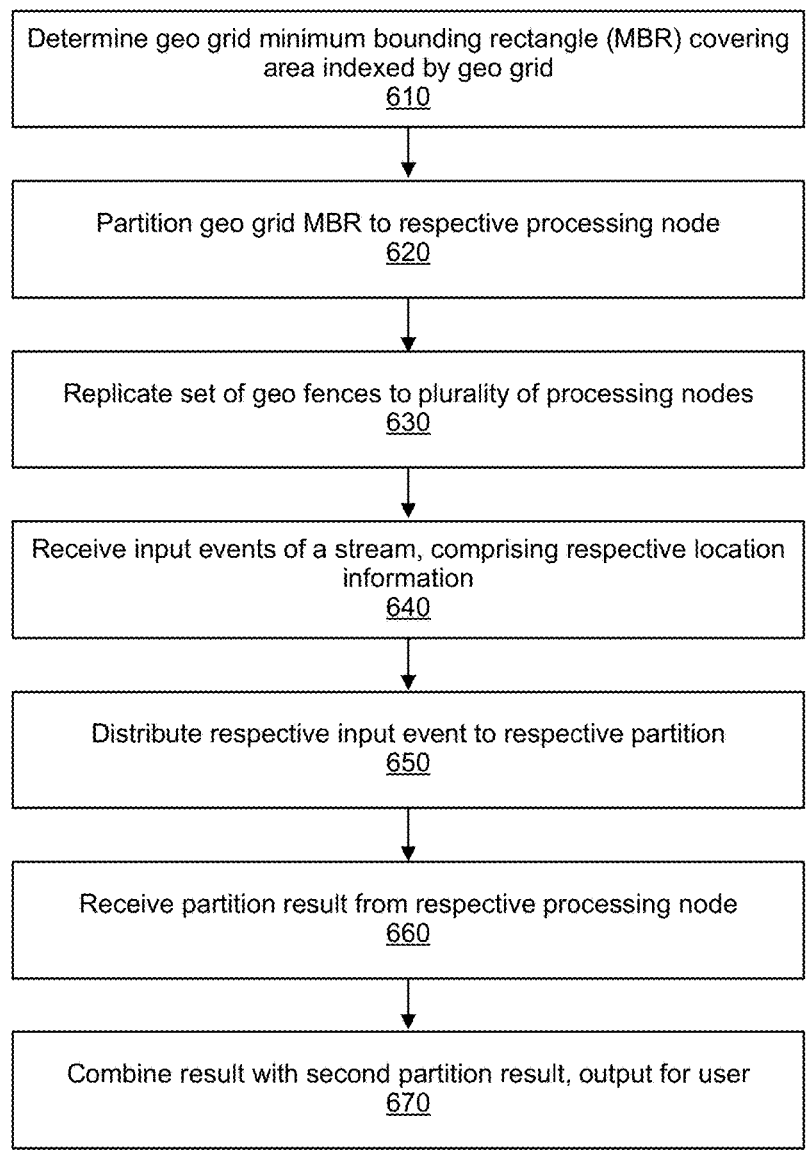
FIG. 6 is an example flow diagram of a process for distributing geospatial computations with geo-fences, in accordance with an embodiment.

FIG. 6 is an example flow diagram of a process for distributing geospatial computations with geo-fences, in accordance with an embodiment. In various embodiments, the processes depicted in FIG. 6 may be implemented by an event processing system as in the examples of FIGS. 8-11 below, or by another server, computing device, or system. At operation 610, the system can determine a geo grid minimum bounding rectangle (MBR) covering a geographic area indexed by a geo grid.

At operation 620, the system partitions the geo grid minimum bounding rectangle to a respective processing node of a plurality of processing nodes. In an embodiment, the grid cells can correspond to partitions that can be used to distribute the events to processing nodes. In an embodiment, the system can further adjust the cell or partition size of the geo grid. In particular, the system can adjust the total number of latitudinal and longitudinal divisions, or rows and columns, in order to improve the distribution of geo-locations across the processing nodes. For example, the system can determine the size of the grid cells based on a cutoff distance for a geospatial computation.

At operation 630, the system replicates a set of geo fences to the plurality of processing nodes, wherein the geo fences bound regions within the geographic area. The geo-fences can represent boundaries of geographical regions, residential, commercial, or public buildings, other venues, etc. In an embodiment, the system can replicate the entire set of geo-fences in the geo grid over all the processing nodes. Alternatively, the system can partition the geo-fences based on the partitioned MBR, as will be described in the example of FIG. 7 below.

At operation 640, the system receives input events of a stream, a respective input event comprising respective location information for a location within the geographic area. For example, the events can correspond to locations of tracked objects at different times. The location information can include SRS coordinates such as latitude and longitude, GPS coordinates, etc. In an embodiment, the system uses the location information to perform a geospatial computation, such as a proximity computation, for events located in one or more of the geo-fences.

At operation 650, the system distributes the respective input event to a respective partition on the respective processing node based at least in part on the respective location information. In an embodiment, when distributing the respective input event to the respective partition, the system can determine a partition identifier corresponding to the respective location in constant time. In an embodiment, determining the partition identifier corresponding to the respective location in constant time can be based at least in part on a grid cell partitioner partition representation. In an embodiment, determining the partition identifier corresponding to the respective location information in constant time can be based on computing the partition identifier from SRS coordinates, such as longitude and latitude, included in the location information. In an embodiment, computing the partition identifier is based at least in part on a modulus operation and/or a matrix operation. In an embodiment, the system can further map the partition identifier to the respective processing node based at least in part on a modulus operation, a division operation, and/or a custom function.

At operation 660, the system receives, from the respective processing node, an output result corresponding to a respective partition result. In an embodiment, responsive to the respective location information of the respective input event matching a respective geo fence, the respective partition result is computed, by the respective processing node, as a spatial function applied to at least the respective location information.

At operation 670, the system combines the respective partition result with a second partition result to obtain a single result corresponding to a geospatial computation. The system can further output the single result corresponding to the geospatial computation for a user.

Figure 7:
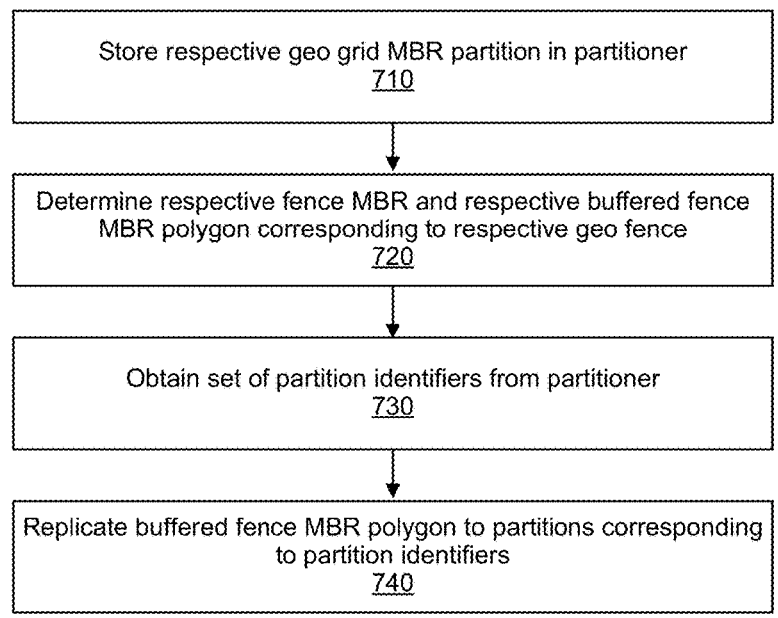
FIG. 7 is an example flow diagram of a process for distributing geo-fences, in accordance with an embodiment.

As described in the example of FIG. 6, the system may replicate the set of geo-fences on all the processing nodes. However, in an embodiment, in order to handle large numbers of geo-fences efficiently, the system can partition the geo-fences based on their locations in the geo-grid. FIG. 7 is an example flow diagram of a process for distributing geo-fences, in accordance with an embodiment. The processes illustrated in FIG. 7 can provide further detail on partitioning the set of geo-fences, as an alternative to replicating the geo-fences in operation 630 of the example of FIG. 6. At operation 710, the system can store a respective geo-grid MBR partition in a partitioner. In an example, the system stores the MBR partitions in a range or sparse partitioner based on a data structure, such as R-Tree or TreeSet, as in the example of FIG. 4B.

At operation 720, the system determines a respective fence MBR and respective buffered fence MBR polygon corresponding to a respective geo-fence in the set of geo-fences. In an embodiment, the buffered fence MBR polygon can be a superset of the fence MBR. The system can use the fence MBR and/or buffered fence MBR polygon, as in the examples of FIGS. 5A and 5B, to determine all the partitions of the geo grid MBR in which part or all of the buffered fence MBR polygon is located. For example, as in Table 3 and FIG. 5B, geo-fence 560 is located partly in partition 2 and partly in partition 3.

At operation 730, the system obtains, from the partitioner, a set of partition identifiers for the respective buffered fence MBR polygon. In the example of Table 3 and FIG. 5B, for geo-fence 560, the partitioner can return identifiers for partition 2 and partition 3. At operation 740, the system replicates the respective buffered fence MBR polygon to partitions corresponding to the set of partition identifiers. In an embodiment, the system can replicate the buffered fence MBR polygon to all the partitions identified. In the example of Table 3 and FIG. 5B, the system can replicate the buffered fence MBR polygon corresponding to geo-fence 560 to processing nodes 3 and 4.

Illustrative Systems

Figure 8:
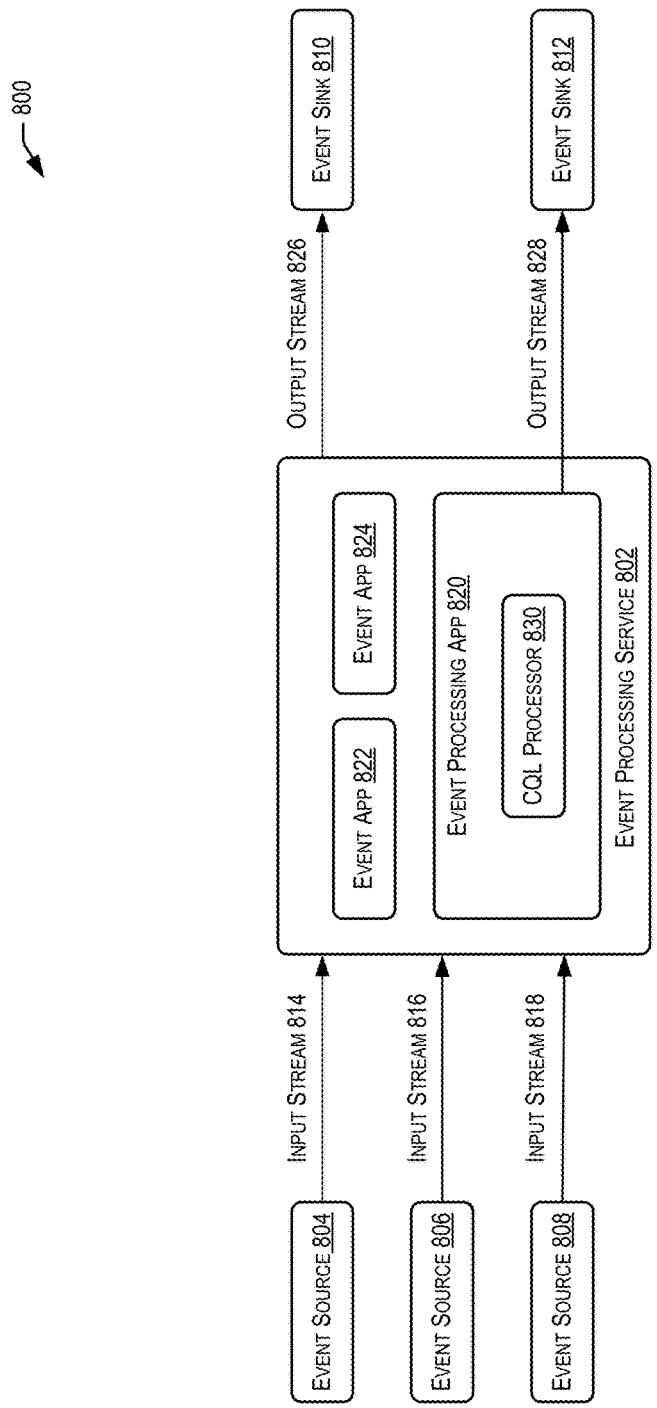
FIG. 8 is an illustration of a simplified high level diagram of an event processing system in accordance with an embodiment of the present disclosure.

FIGS. 8-11 illustrate aspects of example environments for implementing aspects of the present disclosure in accordance with various embodiments. FIG. 8 is an illustration of a simplified high level diagram of an event processing system in accordance with an embodiment of the present disclosure. Event processing system 800 may comprise one or more event sources (804, 806, 808), an event processing service (EPS) 802 (also referred to as CQ Service 802) that is configured to provide an environment for processing event streams, and one or more event sinks (810, 812). The event sources generate event streams that are received by EPS 802. EPS 802 may receive one or more event streams from one or more event sources. For example, as shown in FIG. 8, EPS 802 receives a first input event stream 814 from event source 804, a second input event stream 816 from event source 806, and a third input event stream 818 from event source 808. One or more event processing applications (820, 822, and 824) may be deployed on and be executed by EPS 802. An event processing application executed by EPS 802 may be configured to listen to one or more input event streams, process the events received via the one or more event streams based upon processing logic that selects one or more events from the input event streams as notable events. The notable events may then be sent to one or more event sinks (810, 812) in the form of one or more output event streams. For example, in FIG. 8, EPS 802 outputs a first output event stream 826 to event sink 810, and a second output event stream 828 to event sink 812. In certain embodiments, event sources, event processing applications, and event sinks are decoupled from each other such that one can add or remove any of these components without causing changes to the other components.

In one embodiment, EPS 802 may be implemented as a Java server comprising a lightweight Java application container, such as one based upon Equinox OSGi, with shared services. In some embodiments, EPS 802 may support ultra-high throughput and microsecond latency for processing events, for example, by using JRockit Real Time. EPS 802 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 8 provides a drilldown for one such event processing application 820. As shown in FIG. 8, event processing application 820 is configured to listen to input event stream 818, execute a continuous query 830 comprising logic for selecting one or more notable events from input event stream 818, and output the selected notable events via output event stream 828 to event sink 812. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 820 in FIG. 8 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 802 without having to store all the received events data. Accordingly, EPS 802 provides a special querying mechanism that enables processing of events to be performed as the events are received by EPS 802 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 802 for a particular event stream may be executed each time that an event is received in that event stream. As part of the continuous query execution, EPS 802 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 800 depicted in FIG. 8 may have other components than those depicted in FIG. 8. Further, the embodiment shown in FIG. 8 is only one example of a system that may incorporate an embodiment of the present disclosure. In some other embodiments, system 800 may have more or fewer components than shown in FIG. 8, may combine two or more components, or may have a different configuration or arrangement of components. System 800 can be of various types including a service provider computer, a personal computer, a portable device (e.g., a mobile telephone or device), a workstation, a network computer, a mainframe, a kiosk, a server, or any other data processing system. In some other embodiments, system 800 may be configured as a distributed system where one or more components of system 800 are distributed across one or more networks in the cloud.

The one or more of the components depicted in FIG. 8 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 9:
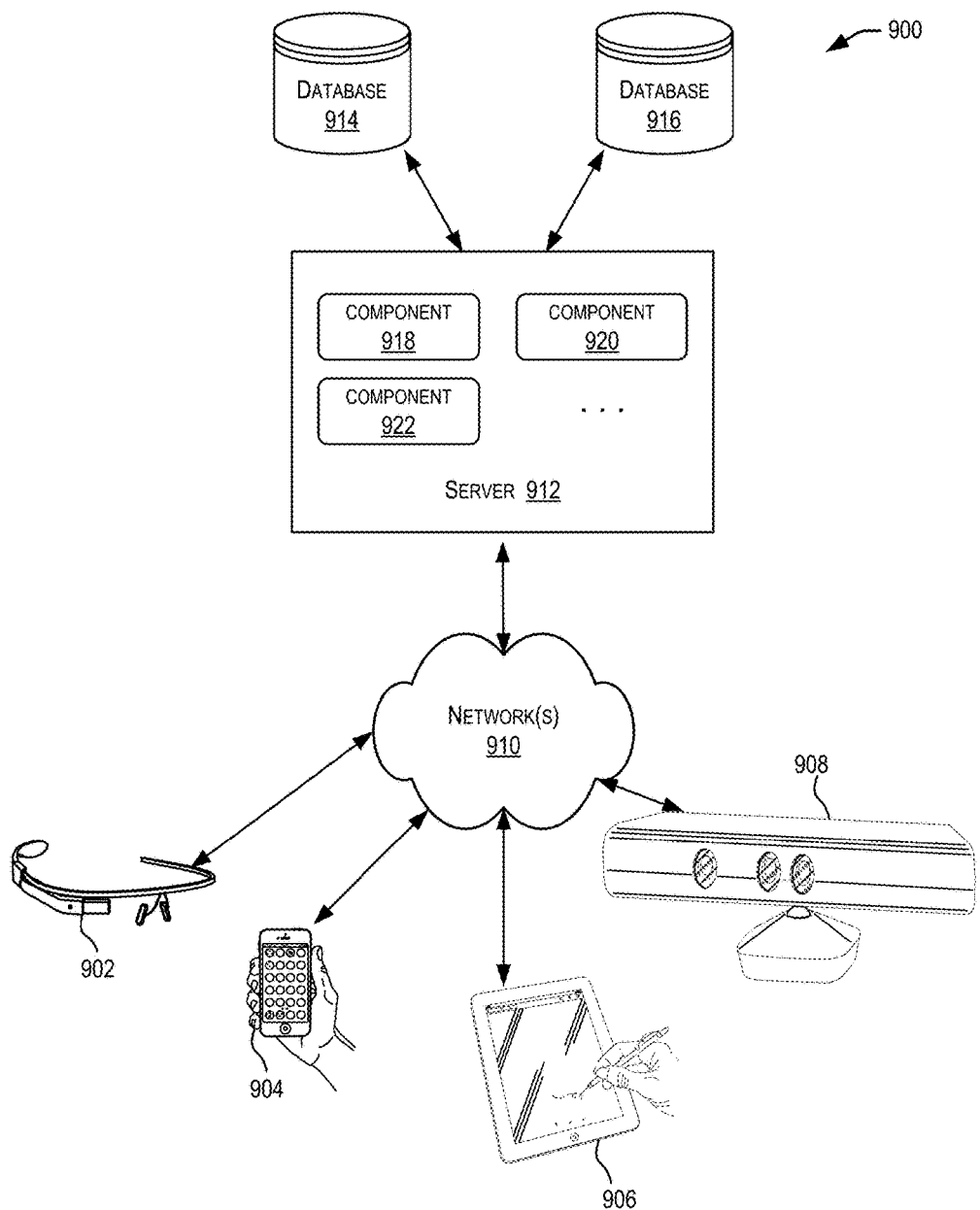
FIG. 9 depicts a simplified diagram of a distributed system for implementing an embodiment of the present disclosure.

FIG. 9 depicts a simplified diagram of a distributed system 900 for implementing an embodiment of the present disclosure. In the illustrated embodiment, the distributed system 900 includes one or more client computing devices 902, 904, 906, and 908, which are configured to execute and operate a client application such as a web browser, proprietary client (e.g., Oracle Forms), or the like over one or more network(s) 910. The server 912 may be communicatively coupled with the remote client computing devices 902, 904, 906, and 908 via network 910.

In various embodiments, the server 912 may be adapted to run one or more services or software applications such as services and applications that provide identity management services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as user identity information, and other information used by embodiments of the present disclosure. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the functions attributed to the server 912 may be stored locally on the server 912 and/or remotely, as appropriate. In one set of embodiments, the databases 914 and 916 may include relational databases, such as databases provided by Oracle, that are adapted to store, update, and retrieve data in response to SQL-formatted commands.

Figure 10:
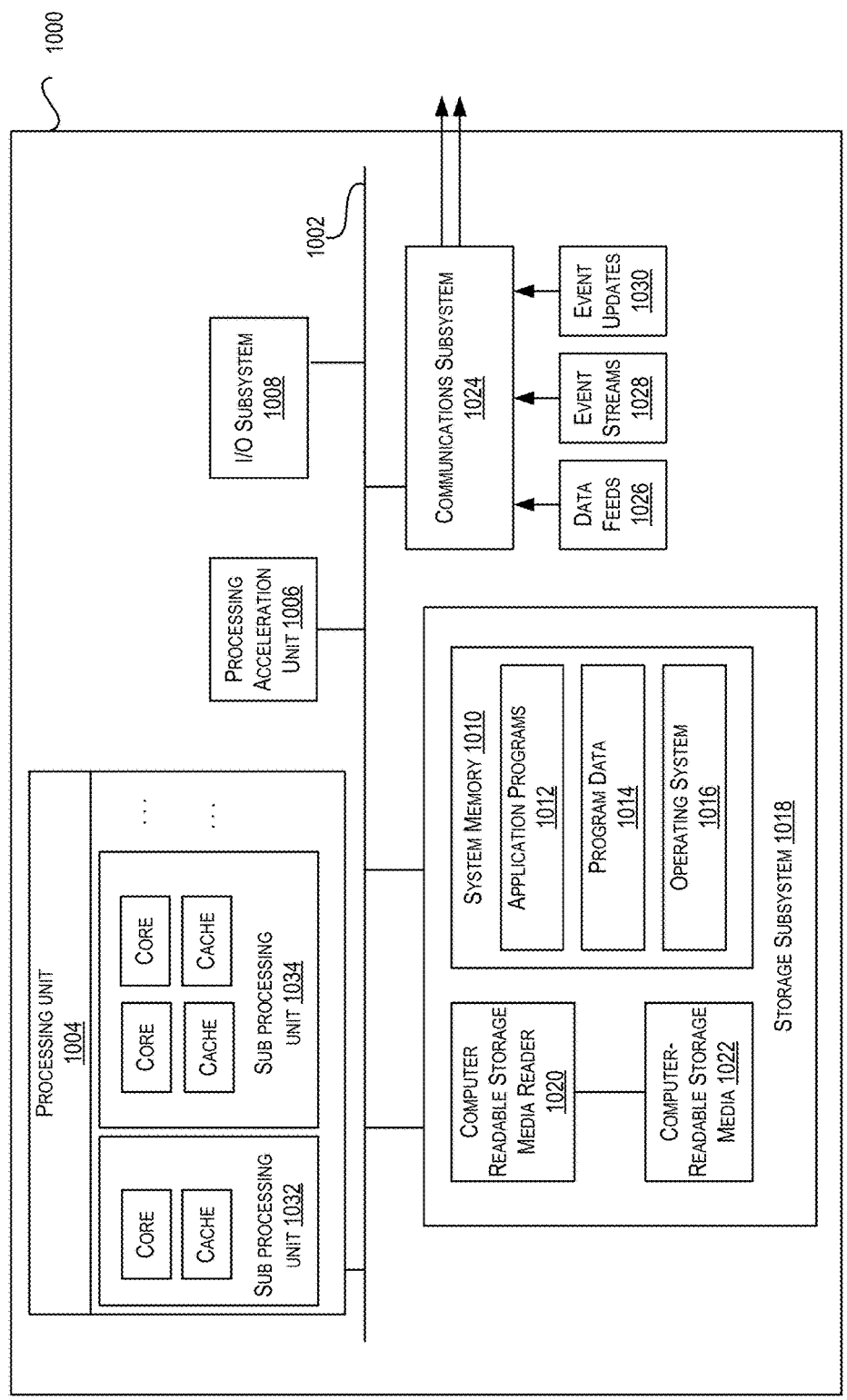
FIG. 10 is a simplified block diagram of one or more components of a system environment by which services provided by one or more components of an embodiment system may be offered as cloud services, in accordance with an embodiment of the present disclosure.

FIG. 10 illustrates an exemplary computer system 1000 that may be used to implement an embodiment of the present disclosure. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for dynamically modifying documents (e.g., webpages) responsive to usage patterns.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. Additionally, communication subsystem 1024 may be used to communicate notifications of successful logins or notifications to re-enter a password from the privileged account manager to the requesting users.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

Figure 11:
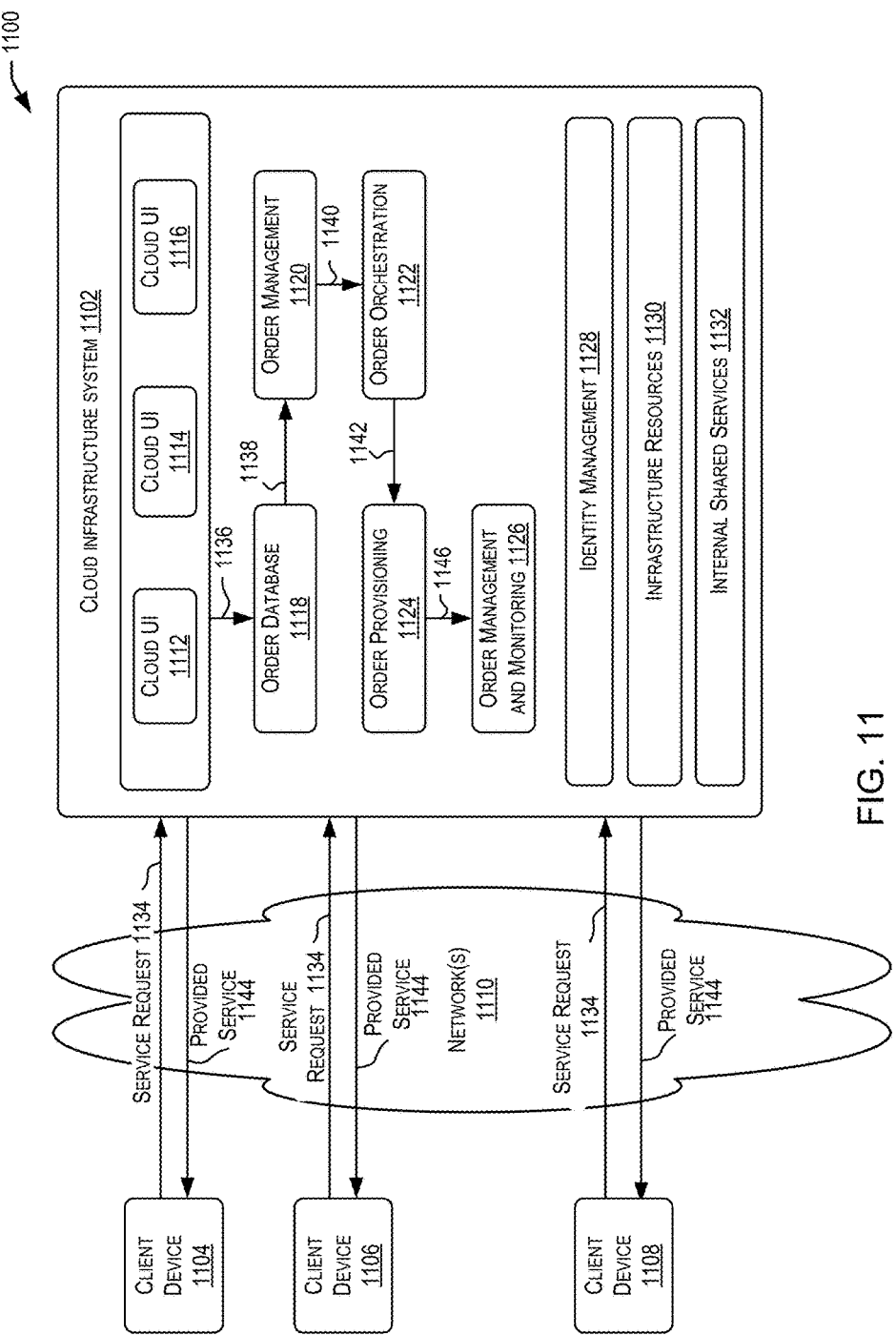
FIG. 11 illustrates an example computer system that may be used to implement an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the disclosure. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 902, 904, 906, and 908.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 910.

Cloud infrastructure system 1102 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102. At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method, comprising:
   distributing, by a computing device, information that defines a plurality of geo fences among a plurality of processing nodes, the plurality of geo fences identifying bounding regions within a geographic area;
   receiving input events of a stream, a respective input event of the input events comprising respective location information for a location within the geographic area;
   transmitting the respective input event to a respective partition on a respective processing node of the plurality of processing nodes based at least in part on the respective location information;
   receiving, from the respective processing node, an output result corresponding to a respective partition result;
   combining, by the computing device, the output result with a second partition result to obtain a single result corresponding to a geospatial computation; and
   preparing, for output, the single result corresponding to the geospatial computation for a user.

2. The method of claim 1, wherein distributing the information that defines the plurality of geo fences comprises:
   obtaining one or more fence partition identifiers for a respective geo fence in the plurality of geo fences, the one or more fence partition identifiers based at least in part on a respective bounding region of the geographic area associated with the respective geo fence;
   mapping the one or more fence partition identifiers to at least the respective processing node; and
   transmitting respective information that defines the respective geo fence to at least the respective processing node.

3. The method of claim 2, wherein the one or more fence partition identifiers are obtained from a sparse partitioner.

4. The method of claim 3, wherein the sparse partitioner obtains the one or more fence partition identifiers from an RTree or another data structure.

5. The method of claim 2, wherein the respective processing node stores an index of an RTree or another data structure, the index corresponding to the respective geo fence.

6. The method of claim 2, wherein the one or more fence partition identifiers correspond to one or more grid cells of a geo grid corresponding to the geographic area, a respective grid cell of the one or more grid cells containing at least a part of the respective bounding region.

7. The method of claim 1, wherein distributing the information that defines the plurality of geo fences comprises replicating the information that defines the plurality of geo fences to the plurality of processing nodes.

8. The method of claim 1, further comprising:
   adjusting a cell size for a plurality of grid cells in a geo grid, wherein the grid cells correspond to partitions used to distribute the respective input event to the respective processing node; and
   updating a distribution of events across the processing nodes based on adjusted partitions associated with the adjusted cell size.

9. The method of claim 8, wherein the adjusted cell size is determined based on a cutoff distance for the geospatial computation.

10. The method of claim 8, wherein a number of the adjusted partitions exceeds a number of processing nodes of the plurality of processing nodes.

11. A system, comprising:
    a memory configured to store computer-executable instructions; and
    a processor configured to access the memory and execute the computer-executable instructions to perform a method for distributing a geospatial computation, the method comprising:
      distributing information that defines a plurality of geo fences among a plurality of processing nodes, the plurality of geo fences identifying bounding regions within a geographic area;
      receiving input events of a stream, a respective input event of the input events comprising respective location information for a location within the geographic area;
      transmitting the respective input event to a respective partition on a respective processing node of the plurality of processing nodes based at least in part on the respective location information;
      receiving, from the respective processing node, an output result corresponding to a respective partition result;
      combining, by the computing device, the output result with a second partition result to obtain a single result corresponding to a geospatial computation; and
      preparing, for output, the single result corresponding to the geospatial computation for a user.

12. The system of claim 11, wherein distributing the information that defines the plurality of geo fences comprises:
    obtaining one or more fence partition identifiers for a respective geo fence in the plurality of geo fences, the one or more fence partition identifiers based at least in part on a respective bounding region of the geographic area associated with the respective geo fence;

mapping the one or more fence partition identifiers to at least the respective processing node; and transmitting respective information that defines the respective geo fence to at least the respective processing node.

13. The system of claim 11, wherein distributing the information that defines the plurality of geo fences comprises replicating the information that defines the plurality of geo fences to the plurality of processing nodes.

14. The system of claim 11, further comprising:

adjusting a cell size for a plurality of grid cells in a geo grid, wherein the grid cells correspond to partitions used to distribute the respective input event to the respective processing node; and updating a distribution of events across the processing nodes based on adjusted partitions associated with the adjusted cell size.

15. The system of claim 14, wherein the adjusted cell size is determined based on a cutoff distance for a geospatial computation.

16. The method of claim 14, wherein a number of the adjusted partitions exceeds a number of processing nodes of the plurality of processing nodes.

17. A non-transitory computer-readable medium storing computer-executable code that, when executed by a processor, cause the processor to perform a method for distributing a geospatial computation, the method comprising:

distributing information that defines a plurality of geo fences among a plurality of processing nodes, the plurality of geo fences identifying bounding regions within a geographic area;

receiving input events of a stream, a respective input event of the input events comprising respective location information for a location within the geographic area;

transmitting the respective input event to a respective partition on a respective processing node of the plurality of processing nodes based at least in part on the respective location information;

receiving, from the respective processing node, an output result corresponding to a respective partition result;

combining, by the computing device, the output result with a second partition result to obtain a single result corresponding to a geospatial computation; and preparing, for output, the single result corresponding to the geospatial computation for a user.

18. The non-transitory computer-readable medium of claim 17, wherein distributing the information that defines the plurality of geo fences comprises:

obtaining one or more fence partition identifiers for a respective geo fence in the plurality of geo fences, the one or more fence partition identifiers based at least in part on a respective bounding region of the geographic area associated with the respective geo fence;

mapping the one or more fence partition identifiers to at least the respective processing node; and transmitting respective information that defines the respective geo fence to at least the respective processing node.

19. The non-transitory computer-readable medium of claim 18, wherein the one or more fence partition identifiers are obtained from a sparse partitioner.

20. The non-transitory computer-readable medium of claim 18, wherein the one or more fence partition identifiers correspond to one or more grid cells of a geo grid corresponding to the geographic area, a respective grid cell of the one or more grid cells containing at least a part of the respective bounding region.

* * * * *

UNITED STATES PATENT AND TRADEMARK OFFICE
CERTIFICATE OF CORRECTION

PATENT NO. : 10,349,210 B2
APPLICATION NO. : 16/249468
DATED : July 9, 2019
INVENTOR(S) : Kumar et al.

Page 1 of 1

It is certified that error appears in the above-identified patent and that said Letters Patent is hereby corrected as shown below:

In the Specification

In Column 5, Line 29, delete ""stock value."" and insert -- "stock_value." --, therefor.

In Column 14, Line 64, delete "computation." and insert -- computation --, therefor.

In Column 16, Line 17, delete "geo-grid" and insert -- geo-grid. --, therefor.

In Column 16, Line 20, delete "ignoring" and insert -- ignoring. --, therefor.

In Column 17, Line 27, delete "geo-grid" and insert -- geo-grid. --, therefor.

In Column 17, Line 30, delete "ignoring" and insert -- ignoring. --, therefor.

In Column 24, Line 42, delete "Internet" and insert -- Internetwork --, therefor.

In the Claims

In Column 37, Line 23, in Claim 16, delete "method" and insert -- system --, therefor.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*